United States Patent
Stupp

(10) Patent No.: US 10,076,766 B2
(45) Date of Patent: Sep. 18, 2018

(54) APPLICATION SYSTEM AND CORRESPONDING APPLICATION METHOD

(71) Applicant: Durr Systems GmbH, Bietigheim-Bissingen (DE)

(72) Inventor: Manuel Stupp, Kronau (DE)

(73) Assignee: Durr Systems, GmbH, Bietigheim-Bissingen (DE)

( * ) Notice: Subject to any disclaimer, the term of this patent is extended or adjusted under 35 U.S.C. 154(b) by 227 days.

(21) Appl. No.: 15/022,379

(22) PCT Filed: Sep. 1, 2014

(86) PCT No.: PCT/EP2014/002358
§ 371 (c)(1),
(2) Date: Mar. 16, 2016

(87) PCT Pub. No.: WO2015/036096
PCT Pub. Date: Mar. 19, 2015

(65) Prior Publication Data
US 2016/0221024 A1    Aug. 4, 2016

(30) Foreign Application Priority Data
Sep. 16, 2013  (DE) .................. 10 2013 015 313

(51) Int. Cl.
*F16K 31/02*     (2006.01)
*B05C 11/10*     (2006.01)
*G01F 25/00*     (2006.01)

(52) U.S. Cl.
CPC ...... *B05C 11/1013* (2013.01); *G01F 25/0007* (2013.01); *G01F 25/0015* (2013.01); *G01F 25/0038* (2013.01)

(58) Field of Classification Search
CPC ............. B05C 11/1013; G01F 25/0007; G01F 25/0015; G01F 25/0038
(Continued)

(56) References Cited

U.S. PATENT DOCUMENTS 3,330,482 A * 7/1967 Crowe .................. G01G 19/00
                                                          118/664
3,457,768 A * 7/1969 Jasek .................. G01F 25/0015
                                                          73/1.23

(Continued)

FOREIGN PATENT DOCUMENTS

CN          101855024 A    10/2010
DE       102006021623 A1   11/2007

(Continued)

OTHER PUBLICATIONS

International Search Report and Written Opinion (with English translation) for PCT/EP2014/002358 dated Nov. 13, 2014 (13 pages).

*Primary Examiner* — Minh Le
(74) *Attorney, Agent, or Firm* — Bejin Bieneman PLC

(57) ABSTRACT

The disclosure relates to an application system and to an application method for applying a fluid (e.g., polyvinyl chloride, adhesive, paint, lubricant, preservation wax, sealant, or PUR foam) to a component (e.g., motor vehicle body component), comprising a flow measuring cell for measuring a quantity flow of the fluid and for producing a measurement signal corresponding to the measured quantity flow, and an evaluating unit for determining the quantity flow from the measurement signal of the flow measuring cellin accordance with a measuring specification. The disclosure further provides a calibrating device for automatically calibrating the measuring specification of the evaluating unit.

17 Claims, 2 Drawing Sheets

Figure 1:
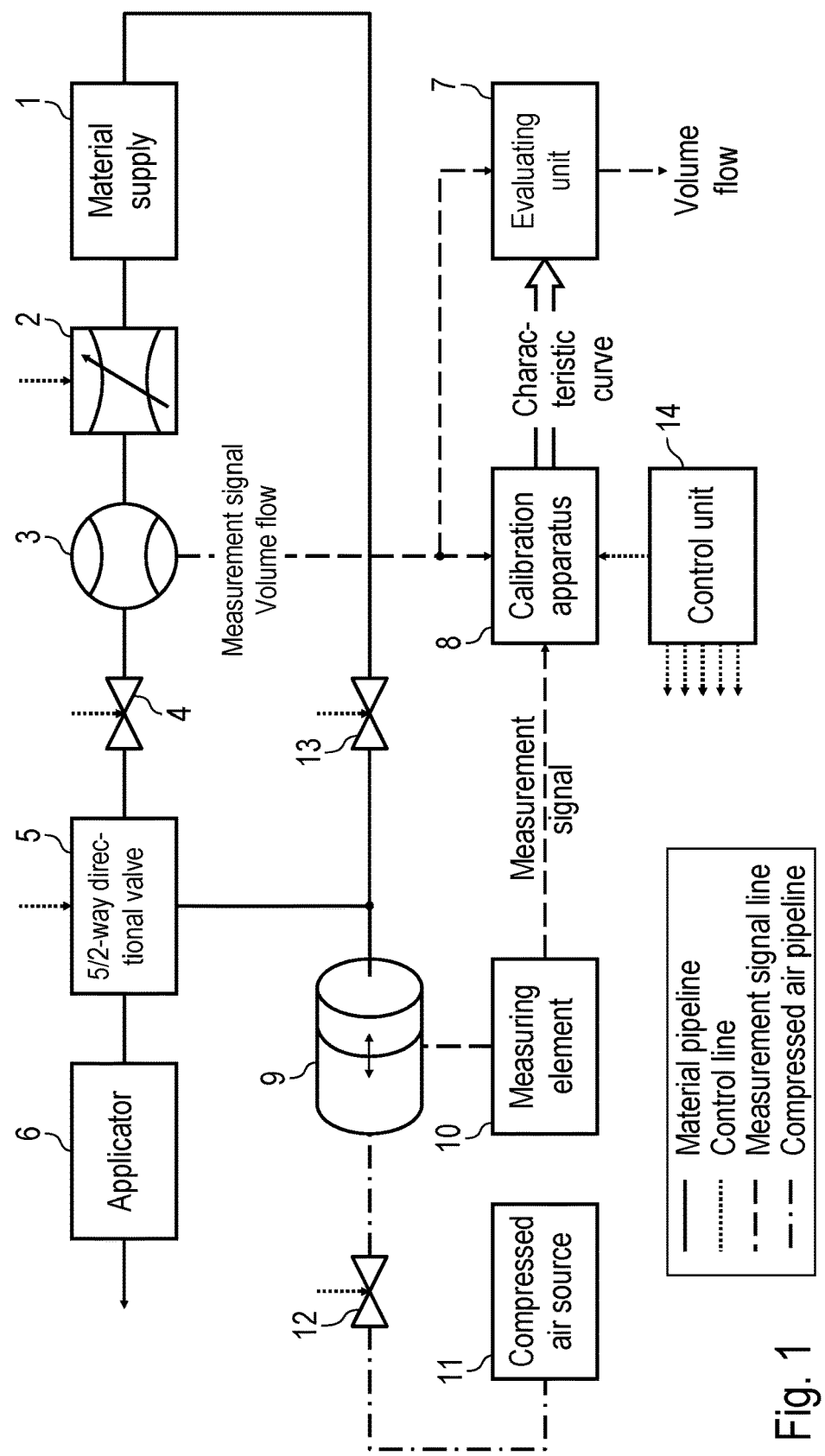

(58) Field of Classification Search
USPC .... 137/488, 487.5; 73/1.16, 1.31, 1.36, 156, 73/196, 223, 239
See application file for complete search history.

(56) References Cited

U.S. PATENT DOCUMENTS

| | | | | |
|---|---|---|---|---|
| 3,774,792 A * | 11/1973 | Willmroth | ............ | B65D 88/548 |
| | | | | 414/416.09 |
| 3,939,688 A * | 2/1976 | Misch | ................ | G01F 25/0038 |
| | | | | 222/135 |
| 4,331,262 A * | 5/1982 | Snyder | ................ | B65B 7/2807 |
| | | | | 141/196 |
| 4,530,465 A | 7/1985 | Gauchet et al. | | |
| 4,897,797 A * | 1/1990 | Free, Jr. | ................ | G01F 11/284 |
| | | | | 210/104 |
| 4,925,096 A * | 5/1990 | Gill | .................... | A01M 7/0092 |
| | | | | 239/10 |
| 5,170,656 A | 12/1992 | Draus | | |
| 5,526,674 A * | 6/1996 | Korpi | ................ | G01F 25/0015 |
| | | | | 73/1.21 |
| 6,374,160 B1 | 4/2002 | Forjahn | | |
| 7,299,944 B2 * | 11/2007 | Roady | ................ | B67D 1/0006 |
| | | | | 222/1 |
| 7,309,203 B2 * | 12/2007 | Clark | .................. | B25J 15/0052 |
| | | | | 294/92 |
| 7,530,211 B2 * | 5/2009 | McErlean | ............ | B65B 5/103 |
| | | | | 414/403 |
| 7,572,107 B2 * | 8/2009 | Heller | ................ | A01M 7/0089 |
| | | | | 417/53 |
| 7,967,168 B2 * | 6/2011 | Geier | .................. | G05D 7/0676 |
| | | | | 222/1 |
| 8,028,651 B2 | 10/2011 | Rademacher et al. | | |
| 8,251,081 B2 * | 8/2012 | Hicks | .................... | G01F 13/006 |
| | | | | 137/1 |
| 8,434,958 B2 | 5/2013 | Rademacher | | |
| 8,646,307 B2 * | 2/2014 | Yasuda | ................... | G01F 1/36 |
| | | | | 702/113 |
| 2005/0161469 A1 | 7/2005 | Roady et al. | | |
| 2009/0112372 A1 | 4/2009 | Peterson | | |
| 2010/0260531 A1 | 10/2010 | Rademacher et al. | | |
| 2014/0318210 A1 * | 10/2014 | Tremel | .................... | B41J 2/175 |
| | | | | 73/1.16 |
| 2017/0016755 A1 * | 1/2017 | Boussange | ........... | G01F 25/0038 |

FOREIGN PATENT DOCUMENTS

| | | | | |
|---|---|---|---|---|
| DE | 102007053073 A1 | 6/2009 | | |
| EP | 1854548 A1 | 11/2007 | | |
| EP | 1975576 A1 * | 10/2008 | ........... | G01F 15/022 |
| EP | 1983310 A1 | 10/2008 | | |
| EP | 2185293 B1 | 6/2012 | | |
| GB | 1275639 A * | 5/1972 | ......... | G01F 25/0015 |
| RU | 2264601 C2 | 11/2005 | | |
| RU | 2458196 C2 | 8/2012 | | |
| WO | 92/08177 A1 | 5/1992 | | |

* cited by examiner

APPLICATION SYSTEM AND CORRESPONDING APPLICATION METHOD

CROSS-REFERENCE TO RELATED APPLICATIONS

This application is a national stage of, and claims priority to, Patent Cooperation Treaty Application No. PCT/EP2014/002358, filed on Sep. 1, 2014, which claims priority to German Application No. DE 10 2013 015 313.1 filed on Sep. 16, 2013, each of which applications are hereby incorporated herein by reference in their entireties.

BACKGROUND

The disclosure relates to an application system and a corresponding application method for applying a fluid (e.g. PVC: polyvinylchloride) to a component (e.g. a motor vehicle bodywork component).

In modern coating systems for coating motor vehicle bodywork components, the material to be applied (e.g. PVC) is conveyed from a material supply to an applicator which applies the fluid to the component. Arranged between the material supply and the applicator is a flow measuring cell which can be configured, for example, as a spindle-type measuring cell, and which generates a volume flow signal corresponding to the fluid flow conveyed from the material supply to the applicator. However, the relationship between the volume flow signal emitted by the flow measuring cell and the actual volume flow depends on the property of the fluid conveyed, which makes suitable calibration necessary. Previously, this calibration of the flow measuring cell has been done manually in that the fluid output by the applicator is delivered into a measuring beaker during the calibration, while the volume flow signal of the measuring cell is measured. From the known volume of the measuring beaker and the measurement values of the flow measuring cell, a measuring specification can then be derived in order to calculate the actually conveyed volume flow of the fluid from the output signal of the flow measuring cell.

A first disadvantage of this calibration method is that the calibration must be carried out by hand, which is error-prone and is associated with an additional effort. Furthermore, during operation, the material properties of the fluid may change due, for example, to a temperature change or a charge change. Such changes may make a renewed calibration necessary, although typically it may not take place. Such deficiencies associated with this calibration method may lead to a deviation between the target quantity and the actual quantity of the applied fluid.

Reference is also made, with regard to the prior art, to DE 10 2007 053 073 A1, DE 10 2006 021 623 A1, EP 2 185 293 B1 and EP 1 854 548 A1. These publications also disclose an application system with a flow measuring cell and an evaluating unit wherein the evaluating unit determines from the measurement signal of the flow measuring cell the quantity flow (volume flow or mass flow) that flows through the flow measuring cell according to a measuring specification. Furthermore, these publications disclose that the application system can be calibrated. However, it is not the measuring specification that is calibrated in the evaluating unit, but the relationship between the flow rate through the flow measuring cell and the pressure and flow conditions downstream behind the flow measuring cell directly at the applicator. In general, a relatively long hose is arranged between the flow measuring cell and the applicator, so that the pressure and flow conditions at the flow measuring cell typically do not reflect the exact pressure and flow conditions at the applicator, but vary, e.g. as a result of "breathing" movements of the hose. The measuring specification stored in the evaluating unit is not calibrated in this case, but remains unchanged. In the context of the calibration, only the relationship between the flow rate through the flow measuring cell and the pressure and flow conditions at the applicator that are of interest are calibrated. A change to the measuring behaviour of the flow measuring cell (for example, due to a change in the temperature or viscosity of the fluid) can therefore not be taken into account in the context of the calibration, which leads to measuring errors.

SUMMARY

The disclosure provides that the calibration of the measuring specification for the flow measuring cell does not take place manually, but automatically by a calibration device which is integrated into the application system.

The application system according to the disclosure has a flow measuring cell through which the fluid to be applied flows and which generates a measurement signal according to the flow rate. For example, the flow rate may be the volume flow or the mass flow of the fluid.

However, a flow measuring cell according to this disclosure is to be understood generally and is not restricted, e.g. to flow rate meters in which the quantity flow (volume flow or mass flow) to be measured flows through the measuring sensor itself. Rather, a flow measuring cell according to this disclosure also includes other types of flow rate sensors, e.g. in which the quantity flow to be measured flows only through a pipeline wherein the flow measuring cell measures the flow rate through the pipelines.

Furthermore, the application system according to the disclosure comprises an evaluating unit which determines from the measurement signal of the flow measuring cell the quantity flow which flows through the flow measuring cell or through the pipeline according to a pre-determined measuring specification. The measuring specification of the evaluating unit is thus intended to describe the relationship between the measurement signal of the flow measuring cell and the quantity flow measured by the flow cell.

The evaluating unit therefore determines the quantity flow which flows through the flow measuring cell itself or at least the quantity flow which flows through the pipeline directly at the flow measuring cell. The flow through the flow measuring cell itself is distinguished exemplary implementations from the quantity flow which flows through a pipeline at another site of the application system, for example, immediately before the applicator. Specifically, the calibration according to the disclosure is directed towards taking account of a change of the measuring behaviour of the flow measuring cell and not a change of another component (e.g. a flexible, breathing hose between the flow measuring cell and the applicator) of the application system.

In exemplary implementations of the disclosure, the evaluating unit has a computer unit which calculates the quantity flow from the measurement signal of the flow measuring cell according to a pre-determined calculating specification. The evaluating unit can thus be implemented as hardware or as software in a digital computer.

The application system according to the disclosure further includes an integrated calibration apparatus for automatic calibration of the measuring specification of the evaluating unit.

In exemplary implementations of the disclosure, the system includes a receiving container into which fluid is delivered during the calibration wherein, in the context of the material delivery into the receiving container, the measurement signal of the flow measuring cell is measured.

Furthermore, the application system according to the disclosure also comprises an applicator (e.g. nozzle, atomiser, etc.) in order to be able to apply the fluid.

Furthermore, the application system according to the disclosure also comprises a material supply for conveying the fluid through the flow measuring cell to the applicator, wherein the material supply typically comprises a pump (e.g. a dosing pump).

The application system according to the disclosure may further include a first valve arrangement which enables the flow measuring cell or the pipeline downstream behind the flow measuring cell to connect optionally to the applicator or the receiving container.

In normal coating operation of the application system, the first valve arrangement connects the flow measuring cell or the pipeline downstream behind the flow measuring cell to the applicator in order to apply the fluid via the applicator.

However, during the actual calibration, the first valve arrangement connects the flow measuring cell or the pipeline downstream behind the flow measuring cell to the receiving container in order to conduct the conveyed fluid into the receiving container.

The calibration apparatus according to the disclosure is connected to the flow measuring cell in order to be able to acquire the measurement signal of the flow measuring cell during the calibration. Furthermore, the calibration apparatus is connected to the evaluating unit, in order to be able to calibrate the evaluating unit of the measuring specification.

In some implementations of the disclosure, the receiving container has a variable receptacle volume. In such implementations, a measuring element is also provided in order to measure the current receptacle volume during the filling of the receiving container with the fluid. In such implementations, the calibration apparatus is connected on the input side both to the flow measuring cell and also to the measuring element in order to be able to take account of the relationship between the measurement signal of the flow measuring cell and the actual conveyed volume.

In other implementations of the disclosure, however, the receiving container has a known receptacle volume and, during the calibration, is completely filled with the fluid flowing through the flow measuring cell. The calibration apparatus then determines the measuring specification depending on the known receptacle volume of the receiving container and the total volume flow measured by the flow measuring cell. In such implementations of the disclosure, the receptacle volume of the receiving container is therefore constant (non-variable). However, in some implementations, the receptacle volume of the receiving container may be variable, but may be kept constant during the calibration process.

Furthermore, in some implementations, the application system according to the disclosure may have a fluid pressure controller which is arranged between the material supply and the flow measuring cell in order to be able to control the fluid pressure. For example, the fluid pressure can be controlled upstream of the flow measuring cell to a pre-determined target value.

Furthermore, in some implementations, the application system according to the disclosure may have a controlling element in order to set the receptacle volume of the receiving container. For example, the receiving container can be configured as a piston-cylinder arrangement, wherein the piston setting of the receiving container determines the receptacle volume. The drive of the piston can be carried out, for example, pneumatically, although another drive type is also possible, for example, an electric motor drive.

In implementations of the disclosure such as described above with a variable receptacle volume of the receiving container, the piston can be continuously displaced during filling, wherein a piston level sensor constantly measures the current fill level. From the output signal of the piston level sensor, firstly, and, secondly, the measurement signal of the flow measuring cell, the measuring specification can be derived in the course of the calibration.

Furthermore, in some implementations, the application system according to the disclosure may comprise a second valve arrangement in order to connect the receiving container to the material supply. This offers the advantage that during the calibration, fluid fed into the receiving container can be conducted back into the material supply and therefore does not have to be disposed of.

Furthermore, in some implementations, the application system according to the disclosure may comprise a third valve arrangement, which is arranged between the flow measuring cell and the first valve arrangement.

Additionally, in some implementations, the controlling element for setting the receptacle volume of the receiving container may include a compressed air source and a fourth valve arrangement wherein the fourth valve arrangement controls the compressed air flow from the compressed air source to the receiving container. In such implementations, the receiving container may be emptied in a controlled manner, for example, back to the material supply. For example, the compressed air source can displace a piston of a piston-cylinder arrangement such that the fluid contained in the cylinder (receiving container) is pushed out of the cylinder.

In some implementations, as opposed to being a volume flow as discussed above, the quantity flow measured by the flow measuring cell may be a mass flow which therefore represents the mass conveyed per unit time.

In some implementations, the first valve arrangement may be a 5/2-way valve between the flow measuring cell and the applicator.

In addition to this application system, the disclosure also includes a corresponding application method wherein the measuring specification for determining the quantity flow from the measurement signal of the flow measuring cell is calibrated automatically.

In some implementations of the disclosure, the receiving container has a variable receptacle volume and, during the calibration, is completely filled with the fluid flowing through the flow measuring cell. During the filling, the variable receptacle volume of the receiving container, that is, the current fill level of the receiving container, is continuously measured. Furthermore, during the calibration, the quantity flow through the flow measuring cell during the filling of the receiving container is measured. The measuring specification can then be determined, for example, in the form of a characteristic curve from, firstly, the measured fill level (receptacle volume) of the receiving container and, secondly, the measurement signal of the flow measuring cell.

In other implementations of the disclosure, however, the receiving container is completely filled with a known receptacle volume wherein then, following filling of the receiving container, the measurement signal of the flow measuring cell is measured. Firstly, from the known receptacle volume of the receiving container and, secondly, from the measurement signal of the flow measuring cell, the measuring specification which gives the relationship between the measurement signal of the flow measuring cell and the actual quantity flow can also be derived. Such implementations of the disclosure make it possible to avoid an additional measuring element for measuring the current fill level of the receiving container.

In some implementations, the fluid stream from the material supply is conducted completely into the receiving container during the calibration, so that the application of the fluid through the applicator is interrupted during the calibration.

Furthermore, the receiving container may be completely emptied before filling during the calibration, wherein this emptying can be carried out, for example, pneumatically.

Finally, the calibration of the measuring specification can be carried out time-controlled at particular time intervals. For example, the calibration can take place at respective time intervals of an hour, a day or a week. Alternatively or additionally, the possibility exists that the calibration is started manually, for example when the fluid is changed.

The calibration may also be carried out between the processing of two components, for example, between the coating of two successive motor vehicle bodywork units.

In some exemplary implementations of the disclosure, the application system applies polyvinylchloride (PVC). However, the principles of the disclosure are also suitable for the application of other fluids, for example, adhesives (one-component adhesives or two-component adhesives), paints, lubricants (e.g. greases, oils), preservative wax, sealants (e.g. for applying sealing beads) or PU (polyurethane) foam.

DRAWINGS

Figure 2:
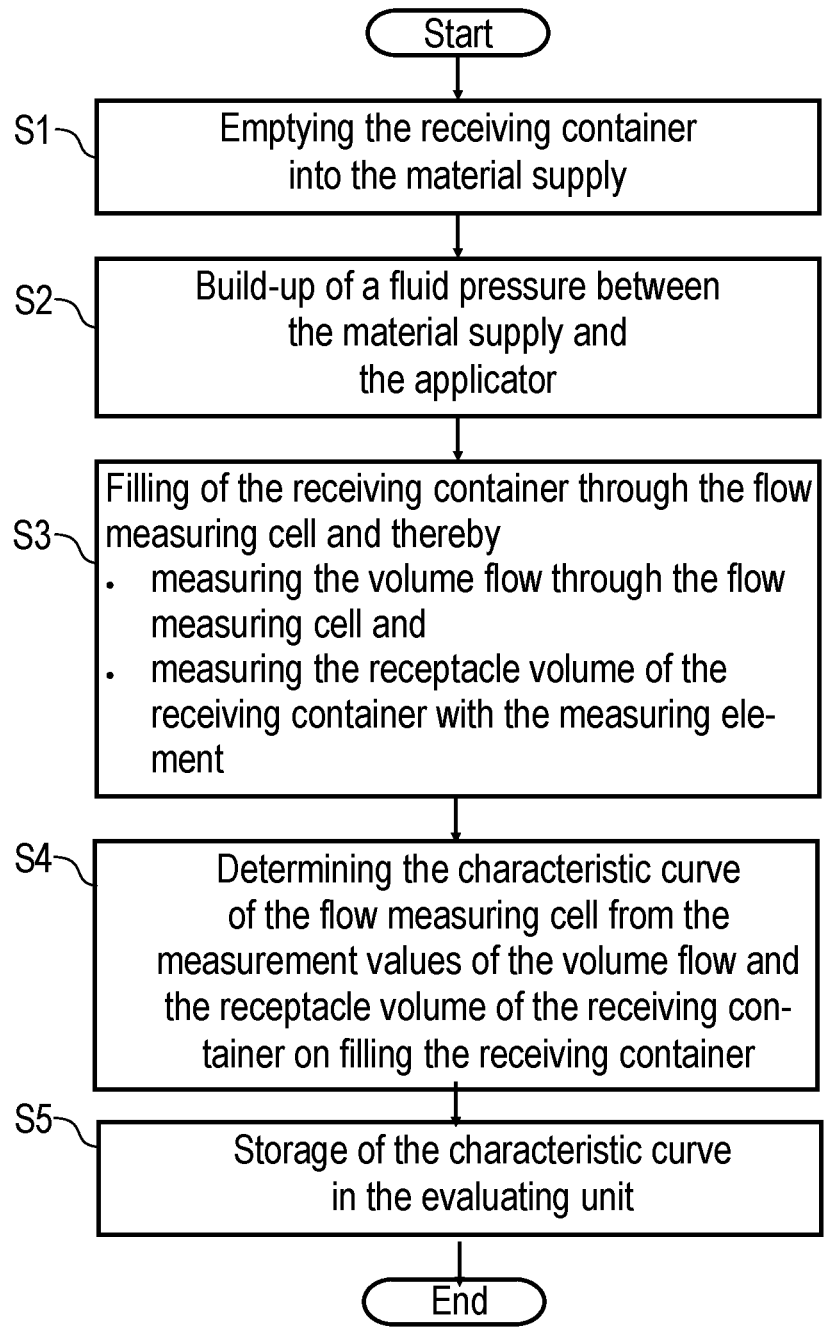

Other advantageous developments of the disclosure are described herein in greater detail together with the description of the exemplary implementations of the disclosure, making reference to the drawings, in which:

FIG. 1 shows a schematic representation of an exemplary embodiment of an application system according to the disclosure with an integrated calibration apparatus, and FIG. 2 shows the application method according to the disclosure with an automatic calibration in the form of a flow chart.

DETAILED DESCRIPTION

FIG. 1 shows, in schematic form, an exemplary embodiment of an application system according to the disclosure with a material supply 1, a material pressure controller 2, a flow measuring cell 3, a controllable valve 4, a 5/2-way valve 5 and, finally, an applicator 6. The material supply 1 conveys the fluid to be applied (e.g. PVC) through the material pressure controller 2, the flow measuring cell 3, the valve 4 and the 5/2-way valve 5 to the applicator 6 which then applies the fluid to a component (e.g. motor vehicle bodywork component).

The flow measuring cell 3 measures the volume flow conveyed from the material supply 1 to the applicator 6 and issues a corresponding electric measurement signal to an evaluating unit 7. As noted above, in some implementations, the evaluating unit 7 may be and/or include a computer unit, i.e. a computing device. It should be understood that, as used herein, a computer unit, a computing device, and or a controller (e.g. the control unit 14 of this disclosure) include a processor and a memory, the memory including one or more forms of computer-readable media, and storing instructions executable by the processor for performing various operations, including as disclosed herein. A computer unit, computing device or controller may include more than one computing device.

From the electrical measurement signal of the flow measuring cell 3, the evaluating unit 7 then calculates the actual volume flow according to a pre-determined measuring specification.

The association between the electrical measurement signal of the flow measuring cell 3 and the resultant volume flow is herein given by a calibration apparatus 8 in the form of a characteristic curve.

During a calibration process, the 5/2-way valve 5 diverts the fluid flow from the material supply 1 to a receiving container 9, wherein a measuring element 10 measures the current fill level of the receiving container 9 and passes on a corresponding measurement signal to the calibration apparatus 8. During the calibration, the calibration apparatus 8 thus receives value pairs consisting, firstly, of the electrical measurement signal of the flow measuring cell 3 corresponding to the measured volume flow and, secondly, the measurement signal measured by the measuring element 10 according to the current receptacle volume of the receiving container 9. From these measurement pairs, the calibration apparatus 8 calculates a characteristic curve which is then stored in the evaluating unit 7 as a measuring specification and, during normal application operation, affects the calculation of the volume flow from the measurement signal of the flow measuring cell 3.

Furthermore, the application system according to the disclosure comprises a compressed air source 11 which is connected via a valve 12 to the receiving container 9 and enables emptying of the receiving container 9. Thus the receiving container 9 is configured as a piston-cylinder arrangement wherein the position of the piston in the receiving container 9 corresponds to the current receptacle volume. When the valve 12 is opened, compressed air flows into the receiving container 9 and displaces a piston therein, so that the fluid situated in the receiving container 9 is pushed out of the receiving container 9.

Furthermore, the receiving container 9 is connected via a valve 13 to the material supply. This connection enables fluid collected in the receiving container 9 during the calibration to be pushed back into the material supply 1, which enables re-use of this fluid.

Finally, the disclosure also comprises a control unit 14 which controls the calibration apparatus 8, the valves 4, 12, 13 and the 5/2-way valve. In this way, the control unit 14 can carry out an automatic calibration of the evaluating unit 7. The execution of these calibrations can take place, for example, in particular time intervals or between the coating of two successive components. Furthermore, the calibration can also be started manually, should this be required.

In a implementation of the operation of the application system according to the disclosure described above, the receiving container 9 is completely filled during the calibration so that, in conjunction with the volume flow measured by the flow measuring cell 3, the known maximum receptacle volume of the receiving container 9 then gives the functional relationship between the measurement signal of the flow measuring cell 3 and the resultant volume flow.

In another implementation according to the disclosure, on the other hand, the receiving container 9 is continually filled during the calibration, wherein the measuring element 10 constantly measures the current receptacle volume. In this way, a plurality of value pairs can be measured, which enables precise calibration.

The calibration method according to the disclosure will now be described making reference to the flow chart of FIG. 2.

In a first step S1, the receiving container 9 is firstly emptied into the material supply 1. For this purpose, the valves 12, 13 are controlled by the control unit 14 such that they open. The compressed air source 11 then controls the piston in the receiving container 9 so that fluid situated in the receiving container 9 is pushed out of the receiving container 9. The fluid pushed out of the receiving container 9 is then pushed via the valve 13 back into the material supply 1.

In a second step S2, a fluid pressure is then built up between the material supply 1 and the applicator 6. Herein, the valves 12 and 13 are closed. Furthermore, the valve 4 between the flow measuring cell 3 and the 5/2-way valve is closed in order to enable the pressure built-up.

Following this pressure build-up, in step S3, filling of the receiving container 9 via the opened valve 4 and the 5/2-way valve 5 takes place. The flow measuring cell 3 herein continually measures the volume flow and issues a corresponding electric measurement signal to the calibration apparatus 8. Furthermore, during the filling of the receiving container 9, the measuring element 10 continually measures the current receptacle volume of the receiving container 9 and emits a corresponding measurement signal to the calibration apparatus 8.

The calibration apparatus 8 then determines, in step S4, a characteristic curve from the pairs of values of, firstly, the electrical measurement signal of the flow measuring cell 3 and, secondly, the measurement signal of the measuring element 10.

In step S5, this characteristic curve is stored in the evaluating unit 7 as a measuring specification and, during normal application operation, serves to calculate the volume flow from the electrical measurement signal of the flow measuring cell 3.

CONCLUSION

A computing unit and/or controller such as those discussed herein, i.e. computing devices, generally include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it should be understood that the disclosure is not restricted to the above-described exemplary implementations. Rather a plurality of implementations and derivations may also be possible which also make use of the principles of this disclosure.

The invention claimed is:

1. An application system, comprising:
a material supply for a fluid;
an applicator;
a flow measuring cell coupled between the material supply and the applicator, the flow measuring cell configured to generate a first measurement signal according to a current quantity flow of the fluid at the flow measuring cell;
a first valve coupled between the applicator and the flow measuring cell;
a receiving container coupled between the first valve and the material supply, the first valve being operable to close communication of the fluid from the material supply to one or more of the applicator and the receiving container;
an evaluating unit in communication with the fluid measuring cell, the evaluating unit configured to receive the measurement signal and determine the quantity flow based on the first measurement signal and a measuring specification;
a container measuring element coupled to the receiving container and configured to generate a container volume measurement signal according to a current fluid volume in the receiving container; and
a calibration apparatus in communication with the fluid measuring cell, the container measuring element, and the evaluating unit, the calibration apparatus configured to update the measuring specification of the evaluating unit based on the first measurement signal and the container volume measurement signal.

2. The application system according to claim 1, wherein the container measuring element is configured to generate a plurality of container volume measurement signals successively based on the current fluid volume in the receiving container during a filling of the receiving container, and
the calibration apparatus is configured to update the measuring specification of the evaluating unit based on the first measurement signal and the plurality of container volume measurement signals.

3. The application system according to claim 2, wherein the container measuring element is configured to generate the container volume measurement signal upon completion of a filling of the receiving container.

4. The application system according to claim 1, further comprising:
a compressed air source coupled to the receiving container configured to apply compressed air to the receiving container; and
a second valve coupled between the compressed air source and the receiving container,
wherein the receiving container includes a piston component, and, upon opening of the second valve and application of the compressed air to the receiving component, the piston component is configured to actuate and displace the fluid in the receiving component therefrom.

5. The application system of claim 4, wherein the piston component is configured to displace the fluid in the receiving component to the material supply.

6. The application system according to claim 5, further comprising:
a third valve coupled between the receiving container and the material supply, to the third valve operable to open the receiving container to the material supply.

7. The application system according to claim 1, further comprising:
a fluid pressure controller coupled between the material supply and the flow measuring cell; and
a fourth valve coupled between the flow measuring cell and the first valve,
wherein, when the fourth valve is closed, the fluid pressure controller is operable to build up a fluid pressure at the flow measuring cell.

8. The application system according to claim 1, wherein the first valve is a 5/2-way valve.

9. A method comprising:
measuring a flow of a fluid at a flow measuring cell, the flow measuring cell being between a material supply and an applicator;
generating a first measurement signal based on the measured flow of the fluid;
determining a quantity flow of the fluid at the flow measuring cell based on the first measurement signal and a measuring specification;
determining a coating operation interval has been met;
directing the flow of the fluid to a receiving container;
measuring a current volume of the fluid in the receiving container;
generating a container volume measurement signal based on the measured current volume of the fluid in the receiving container; and
updating the measuring specification based on the first measurement signal and the container volume measurement signal.

10. The method of claim 9, further comprising:
generating a plurality of container volume measurement signals successively based on the current fluid volume in the receiving container; and
updating the measuring specification based on the first measurement signal and the plurality of container volume measurement signals.

11. The method of claim 9, further comprising:
filling the receiving container with the fluid; and
measuring the flow of the fluid at the flow measuring cell upon completion of the filling of the receiving container.

12. The method of claim 9, further comprising:
closing the applicator from the flow of the fluid.

13. The method of claim 12, further comprising:
interrupting an operation of the applicator.

14. The method of claim 9, further comprising:
emptying the receiving container.

15. The method of claim 14, wherein the receiving container is emptied pneumatically.

16. The method of claim 9, further comprising:
determining that a time interval has been met.

17. The method according to claim 9, further comprising:
determining that a manual control has been activated.

* * * * *